United States Patent

Koch

[11] 4,002,318
[45] Jan. 11, 1977

[54] ELECTOMAGNETIC PRESSURE CONTROL VALVE FOR INCOMPRESSIBLE MEDIA

[75] Inventor: Arwed von Koch, Stuttgart, Germany

[73] Assignee: Daimler-Benz Aktiengesellschaft, Germany

[22] Filed: July 15, 1974

[21] Appl. No.: 488,443

[30] Foreign Application Priority Data

July 20, 1973 Germany ............................ 2336927

[52] U.S. Cl. ................................. 251/129; 251/141
[51] Int. Cl.² ......................................... F16K 31/06
[58] Field of Search ............................ 251/129, 141

[56] References Cited
UNITED STATES PATENTS

| | | | |
|---|---|---|---|
| 3,060,970 | 10/1962 | Aslan | 251/368 X |
| 3,327,264 | 6/1967 | Rodaway | 251/129 X |
| 3,432,140 | 3/1969 | Ray | 251/129 |
| 3,521,854 | 7/1970 | Leiber et al. | 251/129 |
| 3,531,080 | 9/1970 | Dillon | 251/129 |

Primary Examiner—Arnold Rosenthal
Attorney, Agent, or Firm—Craig & Antonelli

[57] ABSTRACT

A pressure control valve for incompressible media, particularly for automatic motor vehicle transmissions, which is constructed as solenoid valve and in which the medium is conducted through a valve gap formed by a valve seat and a valve closure member; the valve closure member is acted upon by a force dependent on the control magnitude, especially on the magnitude of the torque; a predetermined force, produced by a force storage device, such as a spring, acts in the de-energized condition on the valve closure member connected with the armature of the magnet whereby the force is adapted to be varied by energization of the coil in dependence on the control magnitude; the iron casing surrounding the energizing coil terminates in two cylindrical pole shoes disposed concentric to one another and enclosing a ring-shaped magnet gap, whereby the armature carried by the armature support is attracted between the pole shoes with a more or less strong force depending on the coil energization; the armature support is thereby made of a material whose coefficient of thermal expansion coincides at least approximately with that of the material of the housing accommodating the winding and its iron casing while the armature, preferably subdivided into ring segments, is secured on the armature support.

27 Claims, 4 Drawing Figures

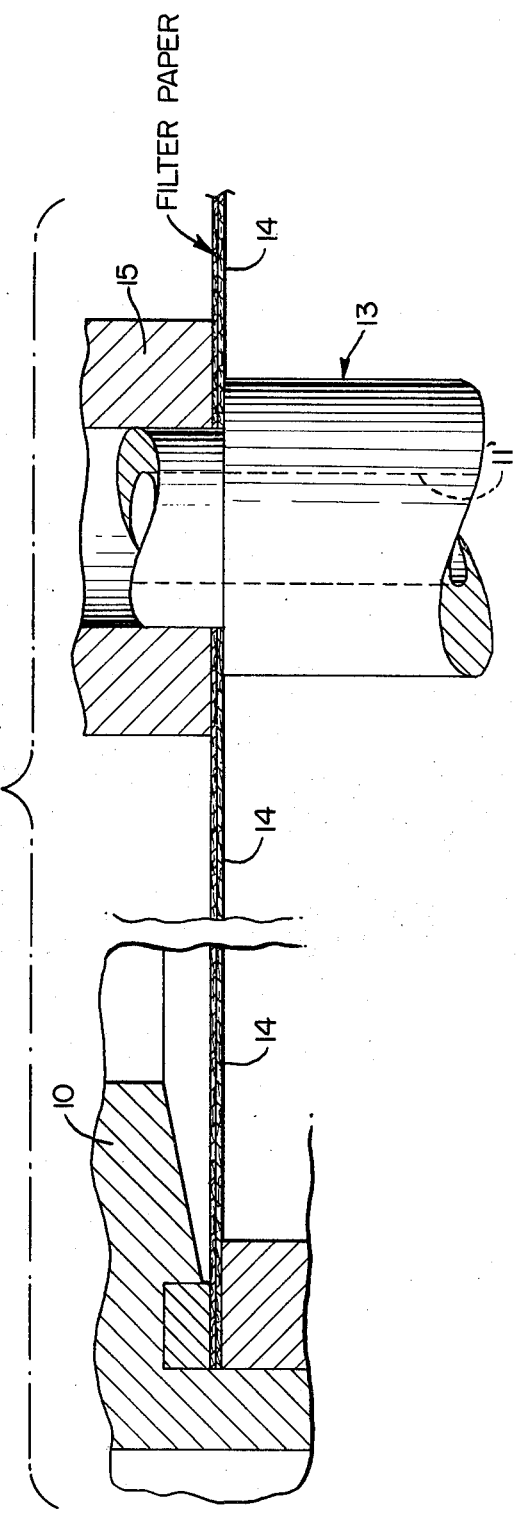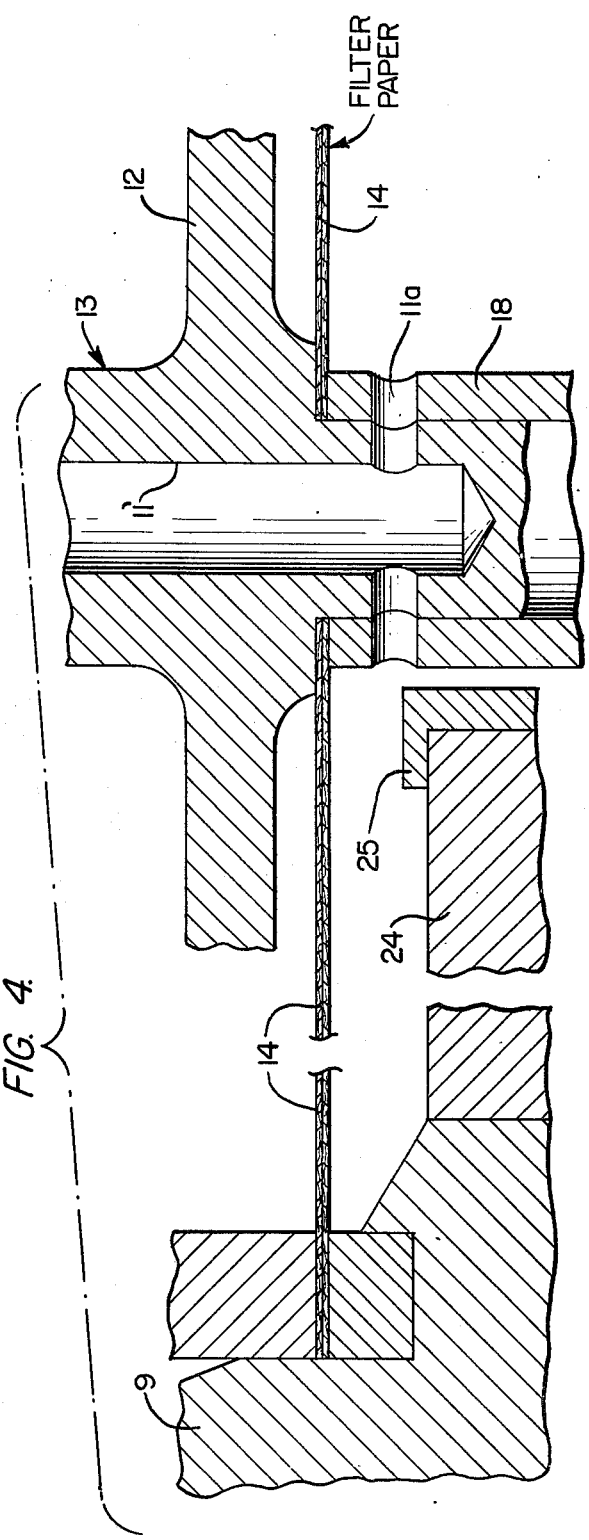

ELECTOMAGNETIC PRESSURE CONTROL VALVE FOR INCOMPRESSIBLE MEDIA

The present invention relates to a pressure control valve for an incompressible medium, especially for an automatically shifting motor vehicle transmission, in which the medium is conducted through a valve gap formed by a valve seat and by a valve closure body and in which the valve closure body is acted upon by a force dependent on the control magnitude, especially dependent on the magnitude of a torque, in such a manner that the control valve is constructed as solenoid valve, whereby a certain force produced by a force storage device acts on the valve closure body connected with the magnet armature in the de-energized condition, which force is variable by energizing the coil in dependence on the control magnitude and in which the iron casing or jacketing surrounding the energizing coil terminates in two cylindrical pole shoes disposed concentric to one another and enclosing a ring-shaped magnet gap, between which the ring-shaped armature carried by a shield-like armature arranged concentrically on the inside of the energizing coil is being attracted axially with a more or less large force depending on the coil energization.

An electromagnet with a very flat force-stroke characteristic is produced by such a construction of the valve, having an axially extending ringshaped magnet gap with radially extending flux lines and with an annular armature axially immersing into the magnet gap; that is, with a constant coil energization, the force is dependent only relatively little from the armature position within a certain range. The magnet characteristics are at least more flat than the valvecharacteristics, i.e., the hydraulic force and possibly the force exerted by a spring on the valve closure body with a change in the position of the valve closure body changes more than the magnetic force exerted on the armature connected therewith. With changes in the position of the armature and of the closure member, the armature force changes less than the valve force and the forces returning this unit into the intended or desired position predominate with respect to the forces seeking to displace the unit out of this position. A stable control is possible as a result thereof.

It is disadvantageous with the flux lines extending radially to the axially moveable armature that the armature forces, as viewed in an absolute manner, are not particularly high. On the other hand, by reason of the accommodation of the solenoid valve in a motor vehicle transmission, i.e., by reason of the lack of space, the magnet part has to be kept quite small. The magnet part of the valve must therefore be constituted particularly efficient, i.e., capable of producing a high power output, by the use of appropriate magnetic materials and of pole shape as well as armature configuration, and the movable parts of the solenoid valve must be constructed so as move as easily as possible in order that the electromagnetic forces can overcome the actuating forces. This high-bred construction of the solenoid valve, however, is sensitive with respect to numerous possible interfering influences.

It is the aim of the present invention to at least lessen, if not eliminate, the sensitivity of such a solenoid valve with respect to interfering influences and breakdown in order that the control accuracy of the valve is not impaired by such interfering influences.

One interfering influence, namely, the temperature dependence is considerably lessened according to the present invention in that the armature support consists of a material whose coefficient of thermal expansion at least approximately coincides with the coefficient of thermal expansion of the material of the housing receiving the coil and its iron casing preferably in that it consists of the same material and in that the armature, preferably subdivided into ring segments, is secured on the armature support.

Since the valves have to operate within a temperature range whose two extreme values are spread apart by far more than 150° C., this measure receives great significance. By the construction of the housing and of the armature support from aluminum, the parts may be constructed favorable from a manufacturing point of view as pressure-castings or extrusion-molded parts. By such a method, the rivet shanks or stems necessary for a temperature-resistant fastening of the armature may also be simultaneously formed-on at the armature support in a favorable manner as regards manufacture.

In order to keep away at least from the shield portion of the armature support the dynamic, pressure forces caused by the flowing medium and thus to reduce a further interfering influence, it is appropriate if the magnet part is shielded from the valve part by a partition wall, through which extends the at least partially prismatically constructed valve closure body with slight play.

Due to abrasion of ferromagnetic movable parts of the hydraulic system, to which belongs the control valve, smallest ferromagnetic particles may reach the medium to be controlled and may be deposited within the area of the magnet gap and thereby influence the characteristic curve of the magnet in its configuration. In order to eliminate this interference, it is appropriate if a magnetic separator is arranged in the inlet of the valve. However, in addition thereto or in lieu thereof, a filter disk sealingly secured in the valve housing may be provided between the valve part and the magnet part. Another possibility to prevent the deposit of magnetic slurry at the pole shoes resides in that liquid-tight diaphragms, through which extends sealingly the shank portion of the armature support, are sealingly arranged in the valve housing axially on both sides of the magnet part of the valve and in that the two spaces enclosed by the diaphragms and the valve housing and located outside of the magnet part of the valve are in operative communication with each other preferably by a bore provided on the inside of the shank portion and in that the magnet part of the valve enclosed by the two diaphragms and the valve housing is completely filled out with a liquid having as low a viscosity as possible and with as low as possible a coefficient of thermal expansion. The magnet part of the valve is hydraulically completely separated from the valve part by encapsulation, however, in such a manner that no feedback effects can occur from the control pressures or volume expansions on the control behavior of the valve.

Accordingly, it is an object of the present invention to provide an electromagnetic pressure control valve for incompressible media which avoids by simple means the aforementioned shortcomings and drawbacks encountered in the prior art.

Another object of the present invention resides in an electromagnetic pressure control valve for incompressible media which easily movable parts and has a high output capacity, yet is relatively insensitive to extraneous interfering influences.

A further object of the present invention resides in an electromagnetic pressure valve of the type described above in which the control accuracy of the valve is not impaired by interfering influences, such as temperature and deposit of ferromagnetic particles, present in the hydraulic medium due to abrasion, at critical parts of the valve structure.

Still a further object of the present invention resides in a solenoid pressure control valve which can be manufactured in a favorable and economical manner.

Another object of the present invention resides in a solenoid pressure control valve of the type described above in which the danger of feedback from the control pressures and/or volume expansions onto the control behavior of the valve is practically eliminated.

These and further objects, features and advantages of the present invention will become more apparent from the following description when taken in connection with the accompanying drawing which shows, for purposes of illustration only, one embodiment in accordance with the present invention, and wherein:

FIGS. 3 and 4 are enlarged detailed views, in partial cross-section, of filter constructions arranged respectively at the upper and lower armature centering elements of the electromagnetic valve of FIG. 1.

Figure 1:
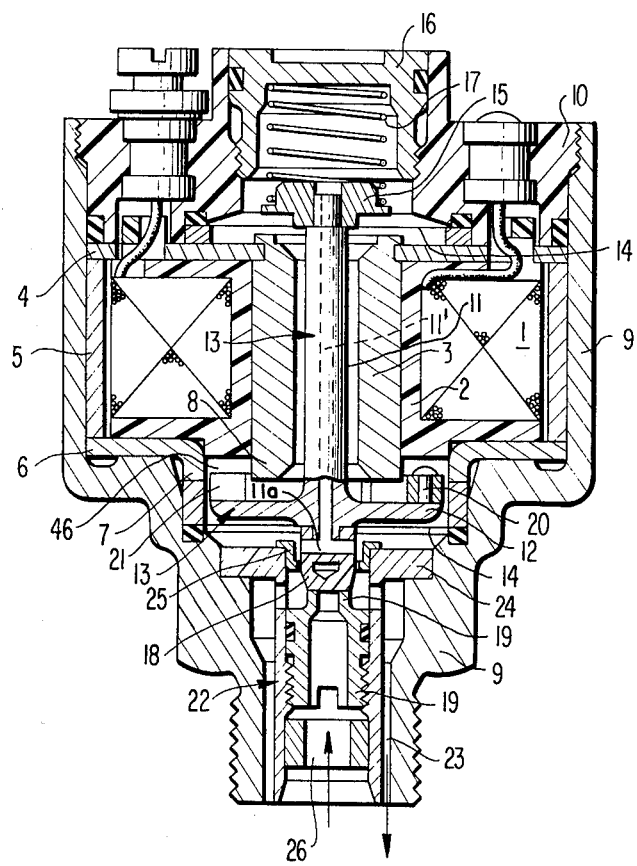
FIG. 1 is a longitudinal cross-sectional view through an electromagnetic valve in accordance with the present invention.

Referring now to the drawing wherein like reference numerals are used throughout the two views to designate like parts, the energizing coil 1 of the electromagnet is wound on a coil carrier 2 which is inserted into a pot-shaped iron casing or jacket consisting of a sintered iron core 3 provided with a hollow bore and of punched-out or stamped-out magnet sheet metal numbers 4, 5 and 6, which terminate in two cylindrical pole shoes 7 and 8 enclosing an axially annular or ring gap 46. The coil 1 together with the iron casing is inserted into a pot-shaped housing 9 of aluminum, which together with the housing of the valve part forms a unitary workpiece. The housing 9 is sealingly closed off on one side by a screwed-on-cover 10, through which extend the coil connections—electrically insulated.

The shield-like armature support generally designated by reference numeral 13 which includes a shank portion 11 and the shield portion 12 is arranged concentrically to the coil 1 and to the iron jacketing 3, 4, 5 and 6; the armature support 13 is supported on both sides of the magnet in centering springs 14 in an axially movable and frictionless manner and radially guided. The annular armature 21 subdivided into ring segments is secured at the shield portion 12 by means of rivets 20. The subdivision into ring segments prevents a magnetic flux in the circumferential direction within the armature and considerably reduces the radial magnetic forces. The round centering springs 14 punched or stamped out of a spring sheet metal material and provided with expansion slots, are radially clamped in somewhat yieldingly at the outer edge between a non-magnetic spacer ring and a rubber-elastic clamping ring, respectively. At the shank portion 11 of the armature support 13, the centering springs 14 are clamped in between a shoulder and the end face of a respective shrunk-on part 15 and 18, respectively. The end of the armature support 13 opposite the valve part carries a spring disk or plate 15, against which acts the spring 17 supported at the cover 10 by way of the adjustable spring abutment 16. The end of the armature support shank 11 which faces the valve part carries the nonmagnetic valve closure member 18 which is pressed against the valve seat 19 with prestress by the spring 17. The armature support 13 is made of the same material as the housing 9, i.e., also of aluminum and therefore does not carry out any relative temperature expansions with respect to the housing. It is constructed as extrusion-molded part in a favorable manner as regards manufacture and the rivet shanks or stems 20 are already formed-on at this individual part.

The valve part of the solenoid valve, in addition to being formed of the portion of the housing 9 coordinated thereto, is formed, on the one hand, of a valve seat support generally designated by reference numeral 22 which is provided with a tubularly shaped portion 23 and with a flange 24 and is suspended in the housing and on the other, of the valve seat 19 adapted to be axially screwed into the same. In a series production, the two parts 22 and 19 are made from a unitary pressure casting. The inflow of the control valve takes place with constant pre-pressure by way of a throttle, through the tubular member 23 and the valve seat 19 against the end face of the valve closure member 18. For purposes of preventing an impact of the flow against the lower centering spring 14 and against the shield portion 12 of the armature support 13, the annular space between the flange 24 and the cylindrical valve closure member 18 is filled out by a diaphragm 25 surrounding the valve closure member 18 with slight play and pressed into the flange 24, which with a suitable design of the housing as pressure casting may also be made in one piece with the housing. For separating ferromagnetic suspended particles out of the medium to be controlled, before the same reach the area of the pole shoes 7 and 8, a magnet separator in the form of a ring-shaped permanent magnet 26 is arranged in the inlet 23 of the valve part. As shown most clearly in FIG. 4, a round filter paper is arranged on the bottom side of the lower one of the two centering springs 14, which is clamped in together with the centering spring 14 at the outer and inner edge in the support thereof. In order to permit also rapid valve movements free of impediments in the presence of the flow resistance which the filter paper represents, and yet, on the other hand, to keep the magnetic slurry away from the pole shoes, the shank portion 11 of the armature support 13 may be provided with a longitudinal bore 11' terminating in radially extending bores 11a (FIGS. 1 and 4) and a filter paper may also be arranged at the upper centering spring 14 as shown most clearly as FIG. 3.

Figure 2:
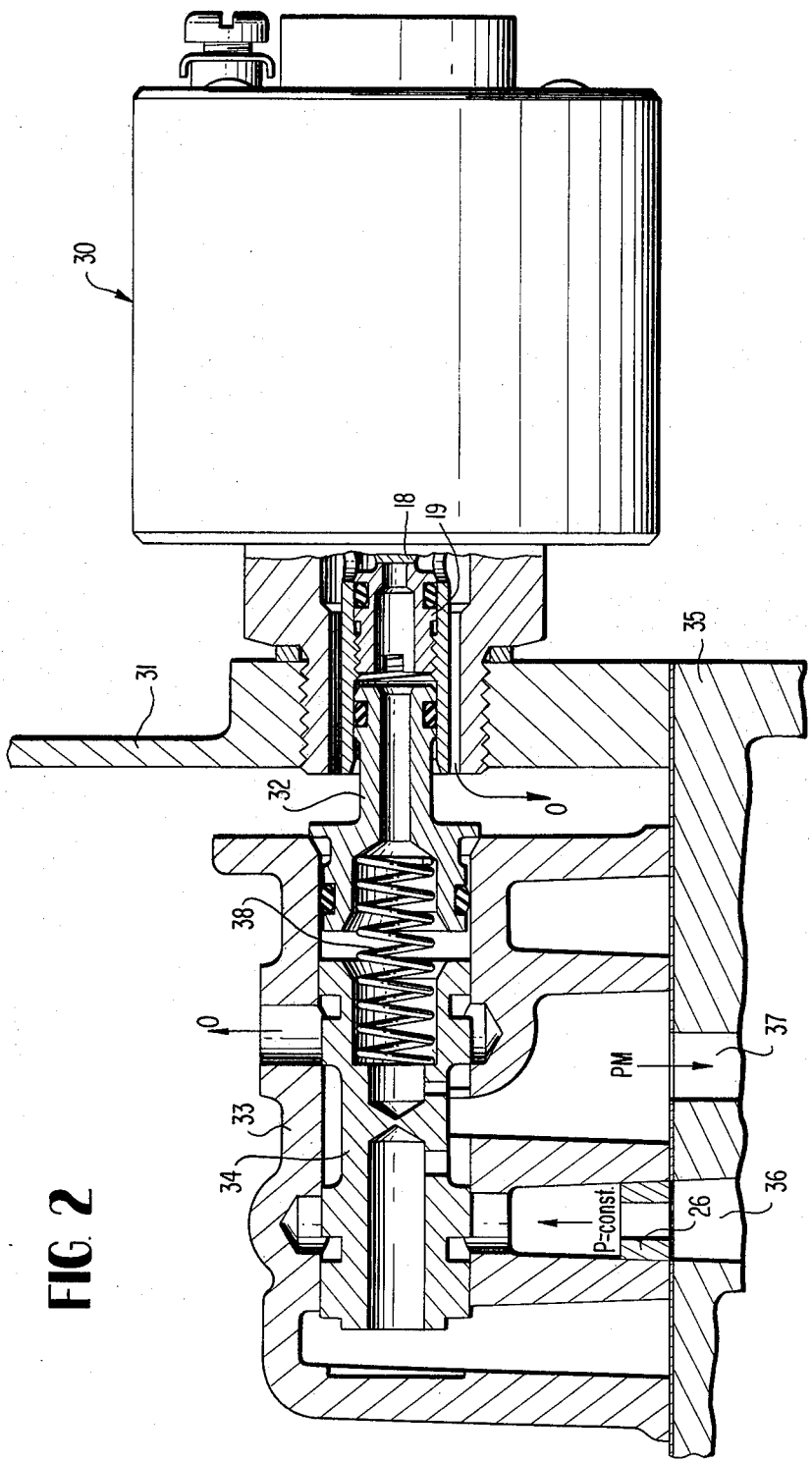
FIG. 2 is a partial cross-sectional view illustrating the use of the valve according to FIG. 1

With the application of the solenoid valve illustrated in FIG. 2, the latter—generally designated by reference numeral 30—is threadably secured at the housing of the control part of a transmission and is connected by way of the plug-in pipe 32 with housing 33 of the modulating pressure control slide valve 34. The housing is threadably secured or screwed onto the transmission housing 35, properly speaking, which is provided with the corresponding connecting lines for the oil supply and discharge (inlet 36, working connection 37). The plug-in pipe 32 has the task to connect the valve oil-tight with the housing 33 to compensate for any possible offset of the bores which may be relatively large due to the threaded connection of different parts; additionally the oil column automatically compensates for the length tolerance which is very advantageous is series construction. The working connection 37 (controlled pressure pm) leads to the pressure side of the actuating piston of a hydraulic lamellae brake or clutch of the transmission, whose lamellae are pressed against one another more or less strongly depending on the energization of the coil of the solenoid valve whereby correspondingly a slower or more rapid engagement or, with predetermined but differing load, an engagement of the clutch or brake within a predetermined time can be effected. The magnetic separator 26 may be arranged advantageously in the inlet 36. Since the controlled pressure pm must be safety reasons assume its maximum valve in case of current failure or cable breakage in order to prevent the destruction of the clutch lamellae (continuous slipping), the maximum pressure is determined by the spring 17 disposed in the valve 30. It is adjusted to the desired value by way of the screw 16. The valve 30 operates as excess pressure valve, as viewed purely mechanically. Since the inlet pressure is larger than the maximum pressure, some working oil always flows through the valve gap 18, 19.

The magnetic force which is adjustable steplessly by the energizing current, acts opposite the spring 17 and permits a change of the oil pressure in the plug-in pipe 32 and therewith on the slide valve surface from a value of zero up to the oil pressure corresponding to the spring 17. Since, however, the modulated oil pressure pm corresponding to the engine torque must never drop below a minimum value, as the braking moment of the engine always has to be still transmitted in the pushing operation, a spring 38 acts directly on the control slide valve which determines the magnitude of the minimum pressure. The transmitted modulated pressure pm is once again amplified to the final working pressure by way of the working pressure control slide valve 34.

The load moment determinative for the shifting hardness of the engageable brakes or clutches of the transmission can be picked up from the suction pipe (in Otto-engines) in the form of the suction pipe vacuum or in engines with fuel injection (Otto or Diesel engines) from the control rack stroke.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A pressure control valve for an incompressible medium in which the medium is conducted through a valve gap formed by a valve seat means and a valve closure means, and in which the valve closure means is acted upon by a force dependent on a control magnitude, the control valve being constructed as an electrically energized solenoid valve including an energizing coil, a magnet armature means operatively connected with the valve closure means and an armature support means for the armature means, a predetermined force produced by a force storage means acting on the valve closure means in the de-energized condition of the coil, said force being variable by energization of the coil in dependence on the control magnitude, magnetic casing means surrounding the energizing coil and terminating in two substantially concentrically disposed pole shoe means enclosing therebetween a magnet gap, and housing means for the coil and casing means, characterized in that the armature means comprises a ring-shaped provided on the armature support means, said ring-shaped armature is attracted axially into the gap with a more or less large force depending on the coil energization, and in that the armature support means consists of a material whose coefficient of thermal expansion at least approximately corresponds to that of the material of the housing means receiving the coil and magnetic casing means.

2. A valve according to claim 1, characterized in the armature support means consists of the same material as the housing means.

3. A valve according to claim 1, characterized in that armature means is secured to the armature support means.

4. A pressure control valve for an incompressible medium in which the medium is conducted through a valve gap formed by a valve seat means and a valve closure means, and in which the valve closure means is acted upon by a force dependent on a control magnitude, the control valve being constructed as an electrically energized solenoid valve including an energizing coil, a magnet armature means operatively connected with the valve closure means and an armature support means for the armature means, a predetermined force produced by a force storage means acting on the valve closure means in the de-energized condition of the coil, said force being variable by energization of the coil in dependence on the control magnitude, magnetic casing means surrounding the energizing coil and terminating in two substantially concentrically disposed pole shoe means enclosing therebetween a magnet gap, the armature means being attracted axially into said gap with a more or less large force depending on the coil energization, and housing means for the coil and casing means, characterized in that the armature support means consists of a material whose coefficient of thermal expansion at least approximately corresponds to that of the material of the housing means receiving the coil and magnetic casing means, and in that the armature means is subdivided into ring segments.

5. A valve according to claim 1, characterized in that the valve is used in an automatically shifted motor vehicle transmission.

6. A valve according to claim 1, characterized in that the valve closure means is acted upon by a force dependent on the magnitude of a torque.

7. A valve according to claim 1, characterized in that the pole shoe means are substantially cylindrical and in that the magnet gap is ring-shaped and enclosed between said pole shoe means.

8. A valve according to claim 1, characterized in that the armature support means is arranged concentrically on the inside of the energizing coil.

9. A valve according to claim 1, characterized in that the armature support includes a shield-like portion supporting thereon the ring-shaped armature means.

10. A valve according to claim 1, characterized in that the housing means and armature support means essentially consist of aluminum.

11. A valve according to claim 10, characterized in that at least the armature support means is constructed as pressure casting.

12. A valve according to claimm 10, characterized in that at least the armature support means is constructed as extrusion-molded part.

13. A pressure control valve for an incompressible medium in which the medium is conducted through a valve gap formed by a valve seat means and a valve closure means, and in which the valve closure means is acted upon by a force dependent on a control magnitude, the control valve being constructed as an electrically energized solenoid valve including an energizing coil, a magnet armature means operatively connected with the valve closure means and an armature support means for the armature means, a predetermined force produced by a force storage means acting on the valve closure means in the de-energized condition of the coil, said force being variable by energization of the coil in dependence on the control magnitude, magnetic casing means surrounding the energizing coil and terminating in two substantially concentrically disposed pole shoe means therebetween a magnet gap, the armature means being attracted axially into said gap with a more or less large force depending on the coil energization, and housing means for the coil and casing means, characterized in that the armature support means consists of a material whose coefficient of thermal expansion at least approximately corresponds to that of the material of the housing means receiving the coil and magnetic casing means, said housing means and said armature support means essentially consist of aluminum, and in that the armature means is riveted to the armature support means and in that rivet shanks are formed-on at the armature support means.

14. A valve according to claim 1, characterized in that the electromagnetic part is shielded from the valve part by a partition wall through which extends with slight play an at least partially prismatically constructed valve closure means.

15. A valve according to claim 14, characterized in that a filter disk means sealingly secured in the valve housing means is arranged between the valve part and the magnet part.

16. A pressure control valve for an incompressible medium in which the medium is conducted through a valve gap formed by a valve seat means and a valve closure means, and in which the valve closure means is acted upon by a force dependent on a control magnitude, the control valve being constructed as an electrically energized solenoid valve including an energizing coil, a magnet armature means operatively connected with the valve closure means and an armature support means for the armature means, a predetermined force produced by a force storage means acting on the valve closure means in the de-energized condition of the coil, said force being variable by energization of the coil in dependence on the control magnitude, magnetic casing means surrounding the energizing coil and terminating in two substantially concentrically disposed pole shoe means enclosing therebetween a magnet gap, the armature means being attracted axially into said gap with a more or less large force depending on the coil energization, and housing means for the coil and casing means, characterized in that the armature support means consists of a material whose coefficient of thermal expansion at least approximately corresponds to that of the material of the housing means receiving the coil and magnetic casing means, the electromagnetic part is shielded from the valve part by a partition wall through which extends with slight play an at least partially prismatically constructed valve closure means, a filter disk means sealingly secured in the valve housing means is arranged between the valve part and the magnet part, and in that a magnetic separator is arranged in the inlet of the valve.

17. A pressure control valve for an incompressible medium in which the medium is conducted through a valve gap formed by a valve seat means and a valve closure means and in which the valve closure means is acted upon by a force dependent on a control magnitude, the control valve being constructed as an electrically energizing solenoid valve including an energizing coil, a magnet armature means operatively connected with the valve closure means and an armature support means for the armature means, a predetermined force produced by a force storage means acting on the valve closure means in the de-energized condition of the coil, said force being variable by energization of the coil in dependence on the control magnitude, magnetic casing means surrounding the energizing coil and terminating in two substantially concentrically disposed pole shoe means enclosing therebetween a magnet gap, the armature being attracted axially into said gap with a more or less large force depending on the coil energization, and housing means for the coil and casing means, characterized in that the armature support means consists of a material whose coefficient of thermal expansion at least approximately corresponds to that of the material of the housing means receiving the coil and magnetic casing means, the electromagnetic part is shielded from the valve part by a partition wall through which extends with slight play an at least partially prismatically constructed valve closure means, and in that liquid-tight diaphragm means are sealing arranged axially on both sides of the magnet part of the valve and in that the two spaces enclosed by the diaphragm means and the valve housing means are located axially outside the magnet part of the valve and are in operative commmunication with each other, and in that the magnet part of the valve enclosed by the two diaphragm means and the valve housing means is filled out substantially completely with a liquid having a low viscosity and a low coefficient of thermal expansion.

18. A valve according to claim 17, characterized in that the two spaces are in communication with each other by way of a bore on the inside of the shank portion of the armature support means.

19. A valve according to claim 18, characterized in that the shank portion of the armature support means extends sealingly through the diaphragm means.

20. A valve according to claim 19, characterized in that a magnetic separator is arranged in the inlet of the valve.

21. A valve according to claim 20, characterized in that a filter disk means sealingly secured in the valve housing means is arranged between the valve part and the magnet part.

22. A valve according to claim 17, characterized in that the housing means and armature support means essentially consist of aluminum.

23. A valve according to claim 17, characterized in that the armature means is subdivided into ring segments.

24. A valve according to claim 17, characterized in that the pole shoe means are substantially cylindrical and enclose therebetween a ring-shaped magnetic gap.

25. A valve according to claim 17, characterized in that the armature support means is arranged concentrically on the inside of the energizing coil.

26. A valve according to claim 17, characterized in that the armature support means includes a shield-like portion supporting thereon the armature means.

27. A pressure control valve for an incompressible medium in which the medium is conducted through a valve gap formed by a valve seat means and a valve closure means, and in which the valve closure means is acted upon by a force dependent on a control magnitude, the control being constructed as an electrically solenoid valve including an energizing coil, a magnet armature means operatively connected with the valve closure means and an armature support means for the armature means, a predetermined force produced by a force storage means acting on the valve closure means in the de-energized condition of the coil, said force being variable by energization of the coil in dependence on the control magnitude, magnetic casing means surrounding the energizing coil and terminating in two substantially concentrically disposed pole shoe means enclosing therebetween a magnet gap, the armature means being attracted axially into said gap with a more or less large force depending on the coil energization, and housing means for the coil and casing means, characterized in that the armature support means consists of a material whose coefficient of thermal expansion at least approximately corresponds to that of the material of the housing means receiving the coil and magnetic casing means, and in that the armature means is riveted to the armature support means and in that rivet shanks are formed-on at the armature support means.

* * * * *